(No Model.)
H. M. HORRNE.
VEHICLE WHEEL.
No. 339,181. Patented Apr. 6, 1886.
2 Sheets—Sheet 1.
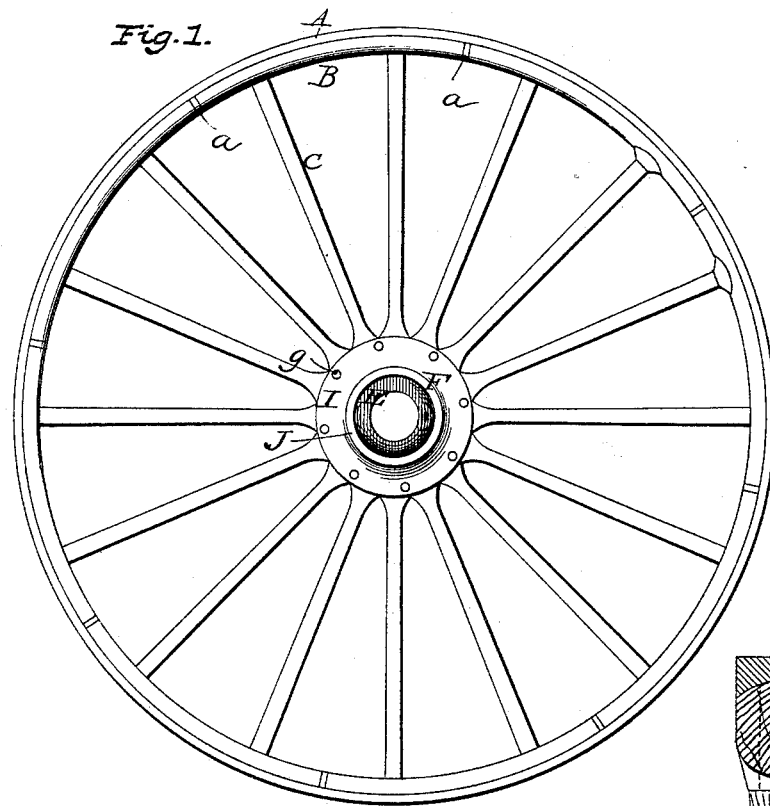
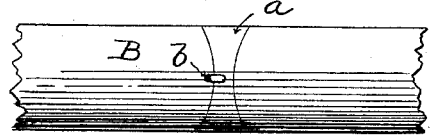
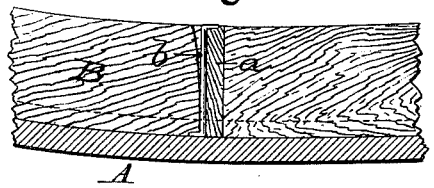
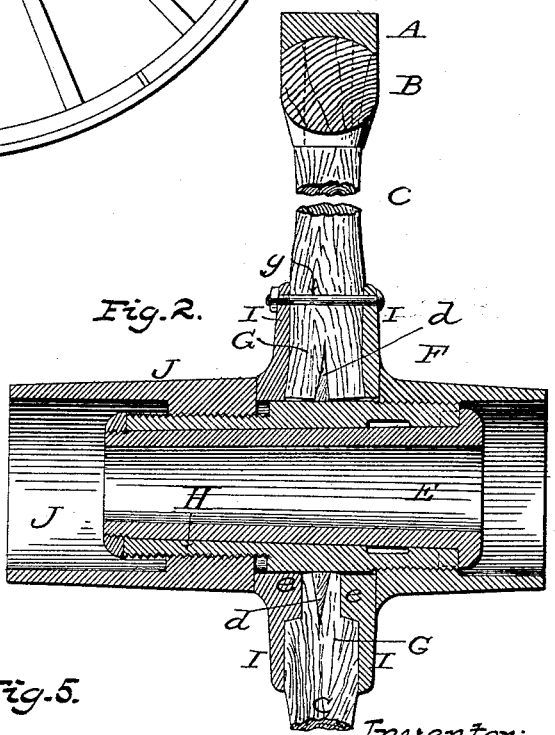
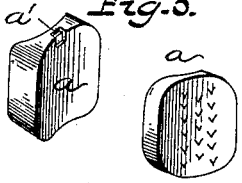
Witnesses:
James P. DeHamel
Walter S. Dodge
Inventor:
Henry M. Horrne,
by Dodgeson
his Attys.
N. PETERS, Photo-Lithographer, Washington, D. C.

(No Model.) 2 Sheets—Sheet 2.
H. M. HORRNE.
VEHICLE WHEEL.
No. 339,181. Patented Apr. 6, 1886.
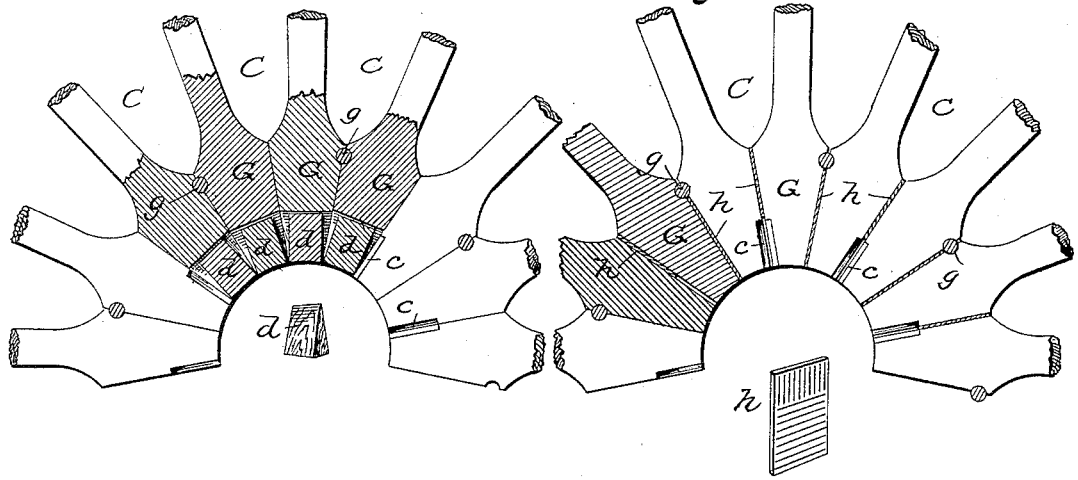
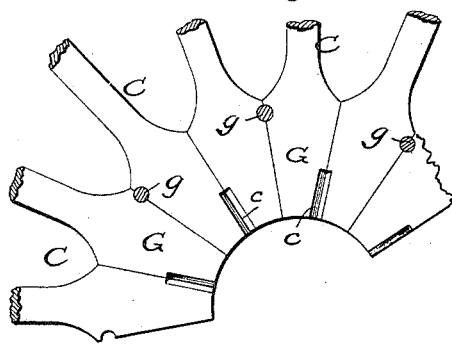
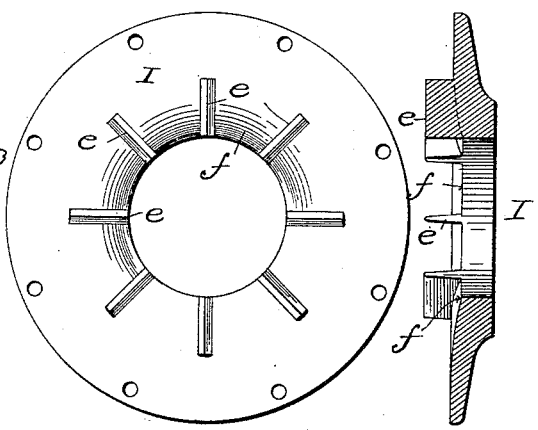
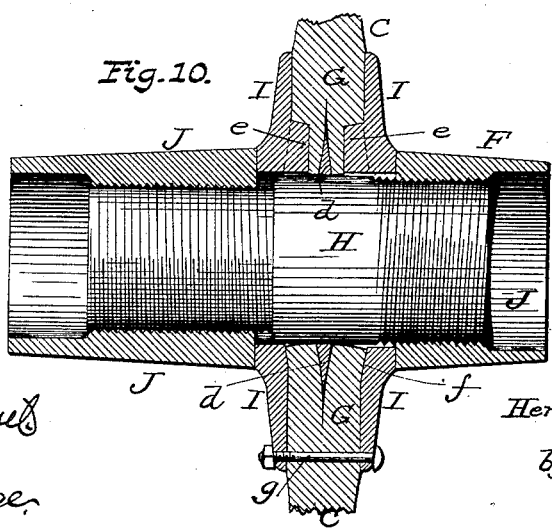
Witnesses:
James P. DeHamel
Walter S. Dodge
Inventor:
Henry M. Horrne,
by Dodge & Son,
his Attys.
N. PETERS. Photo-Lithographer, Washington, D. C.

UNITED STATES PATENT OFFICE.

HENRY M. HORRNE, OF PARIS, ASSIGNOR OF ONE-FOURTH TO JOHN C. RUTHERFORD, OF DOWLIN, TEXAS.

VEHICLE-WHEEL.

SPECIFICATION forming part of Letters Patent No. 339,181, dated April 6, 1886.

Application filed December 30, 1885. Serial No. 187,164. (No model.)

*To all whom it may concern:*

Be it known that I, HENRY M. HORRNE, of Paris, in the county of Lamar and State of Texas, have invented certain new and useful Improvements in Vehicle-Wheels, of which the following is a specification.

My invention relates more particularly to that class of wheels which are constructed by placing the felly-sections against the interior of the tire, with the outer ends of the spokes inserted in the felly-sections, and their inner ends placed side by side in a plane above the plane of the tire and felly, and then forcing the inner ends of the spokes simultaneously and equally toward the plane of the tire and felly. Such a wheel is described in an application filed by me May 12, 1885, Serial No. 165,205; but I wish it understood that the present invention is not restricted to such wheels, as it is apparent that certain of its features can be equally well applied to wheels constructed in a different manner.

In the drawings, Figure 1 is a face view of my wheel; Fig. 2, a vertical section parallel with the axle; Figs. 3 to 10 views illustrating certain details.

A indicates the tire, B the felly, C the spokes, E the axle-box, and F the hub, all of which parts are constructed as hereinafter more particularly described. The tire A has a flat outer bearing-face, straight side walls, and a curved inner face, as clearly shown in Fig. 2, in which curved face or seat the felly B is placed, and by which it is prevented from being displaced laterally. This is particularly desirable for use with wheels constructed by pressing the spokes down to their proper plane, as in my prior application, for the reason that it is requisite that the felly be prevented from slipping in assembling the parts. It will, however, be found useful and desirable in wheels constructed in the ordinary manner, as it not only prevents side movement of but protects the felly from undue wear. The felly B is made of segmental sections, each of which usually receives two spokes, the contiguous ends of the felly being rounded, as in Fig. 3, and suitable dowel blocks or wedges, $a$, being inserted between the felly-sections, as shown. The felly is rounded on its lower face to conform with the curved face of the tire, and it is customary to curve or round the upper or inner faces of the felly-sections, as shown in Fig. 2, to give the wheel a lighter and neater appearance. The curvature of the upper and lower and end faces of the felly-sections is equal, so that they may all be formed by the same cutter.

In the drawings eight felly-sections are shown, and between the ends of the sections are placed the dowel-blocks $a$, the blocks being preferably roughened on one or more faces, as shown in Fig. 5, so as to engage the wood of the felly-sections when driven to place, and prevent accidental displacement.

In taking the wheel apart for any reason it is necessary that means be provided for removing one of the blocks $a$, and to accomplish this I adopt the construction shown in Fig. 4. The block $a$ is smooth, as shown in Fig. 5, and is provided with a seat or recess, $a'$, in its face, in which the end of the spring $b$ fits when the block is driven to its seat. The spring $b$ is preferably made of steel wire, seated and secured in the end of one of the felly-sections, as shown in Fig. 4. Now, when it is desired to take the wheel apart, the spring $b$ is forced back by hand or otherwise out of the notch $a'$, and the block or wedge removed. As soon as the wedge is removed, the others become free and may be easily removed. The spokes C have their inner ends, G, made in the form of a keystone or blunt-ended wedge, as shown in Figs. 6, 7, and 8, and one of the inclined faces of said portion G is beveled each way from the middle, thereby producing the faces $c\ c$. When the spokes are placed together, as in Fig. 8, these faces $c\ c$ form V-shaped mortises or recesses between the alternate spokes or in the faces of the central portion to the wheel. These mortises or recesses occupy about one-half the length of the inner wedge-shaped end, G, of the spokes, leaving the wedge-faces intact beyond the same, to form flat bearing or contact surfaces by which the spokes may bear upon and mutually support each other. As shown in the drawings, one face of the end G of each spoke is left plain, and forms a bearing for the adjacent spoke. In the inner end of each spoke C is a wedge,

*d*, (shown in Figs. 1, 7, and 10,) which spreads the inner ends, G, of said spokes laterally or in the direction of the axle, as shown.

The box E is of the usual construction, and need not be here described in detail.

H indicates a sleeve, fitting upon the exterior of the axle-box E and turning therewith, the sleeve being threaded externally, as shown in Figs. 2 and 10, and reduced in diameter at its outer end, as shown in said figures.

I I indicate face plates or disks, which slip freely over the ends of the sleeve H, and are provided with a series of radial wedges, *e*, as shown in Figs. 2, 6, 7, 9, and 10, to accurately fit the recesses or mortises formed at the inner ends, G, of the spokes by the bevel-faces *c c*, there being a wedge for each of the mortises. The plates I are of such diameter as to cover the ends G of the spokes. Between the wedges *e* the inner face of each plate I is undercut or inclined, as at *f*, to conform to the inner end, G, of the spoke, which has been previously enlarged by the insertion of the wedge *d*, as clearly shown in Figs. 2, 9, and 10. Bolts *g* pass through and between the joints or faces of the spokes, which are not mortised, and through the plate I, as shown in Figs. 6, 7, 8, and 10, so that the wedges *e* and bolts *g* alternate.

To retain the plates I and spokes C in proper position upon the sleeve H, the latter is provided with removable caps or collars J, which screw upon the sleeve and abut at their inner ends against the plates I, as shown in Figs. 2 and 10. It will be noticed that the sleeve H is right-and-left threaded, so that the forward rotation of the wheel will tend constantly to tighten the parts.

In assembling the wheel the sleeve H is inserted through the opening formed by the inner ends of the spokes, and the latter are liable to be injured by the screw-thread on the sleeve H. To avoid this, I reduce one end of the sleeve, so that it will pass through the opening without coming in contact with the inner ends of the spokes, a sleeve being fitted temporarily upon the reduced end or not, as preferred. This construction necessitates making the internal diameter of the collar J, screwing on the reduced end of the sleeve, smaller than the other collar, as shown in Figs. 2 and 10.

In some cases I propose to dispense with the separate box E, and use the sleeve H as the axle-box, as in Fig. 10.

It is found in practice that the spokes shrink at their inner ends and become somewhat loose, and to compensate for this I provide a wedge, *h*, to be inserted between that portion of the inclined faces of the end G not occupied by the wedges *e*, as shown in Fig. 6. In said figure two such wedges are shown, inserted one below the bolt *g* and the other above the wedges *e*. These wedges *h* may be made of any suitable material, and I preferably indent them and roughen their surface in two directions, as shown, so that when inserted and the wheel is tightened up the roughness will engage the wood and prevent the displacement of the wedges.

I am aware that channeled tires have before been constructed, and hence I make no broad claim thereto. The form of tire herein shown and described is easier to roll than other channeled tires, and by having the concave seat for the felly made on the arc of a circle the assembling of the wheel in accordance with the plan set forth in my former application is rendered much easier than it otherwise would be.

Having thus described my invention, what I claim is—

1. In combination with a tire, A, having a concave seat, a felly, B, composed of sections seated therein and having their ends rounded, and blocks *a*, inserted between the ends of the felly-sections and conforming in shape to the felly-sections and tire.

2. In combination with a tire, a felly made in sections and seated therein, a dowel-block between the ends of the felly-sections, and a spring-catch to retain said block in place.

3. In combination with tire A, felly B, spokes C, abutting at their inner ends and provided on one of their adjacent faces with inclines *c c*, disks I, provided with wedges *e* to correspond therewith, sleeve H, and collars J, all arranged substantially as shown.

4. In combination with tire A, felly B, spokes C, abutting at their inner ends, provided with inclines *c c* on one face only, and wedges *d*, disks I, provided with wedges *e* and incline *f*, and sleeve H and collar J.

5. In combination with tire A, felly B, spokes C, abutting at their inner ends and provided with inclines *c c* on one face only, disks I, provided with wedges *e*, bolts *g*, passing between each pair of spokes and alternating with the wedges *e* and collars J, all arranged as shown.

6. In combination with a wheel constructed substantially as herein described and shown, and provided with wedges *e* and bolts *g*, alternating as shown, the plates or wedges *h*, inserted between the plain beveled faces of the spokes above the wedges *e* and below the bolts *g*, as and for the purpose set forth.

HENRY M. HORRNE.

Witnesses:
WALTER S. DODGE,
JAMES F. DU HAMEL.